US012522480B2

(12) United States Patent
Kurihara et al.

(10) Patent No.: US 12,522,480 B2
(45) Date of Patent: Jan. 13, 2026

(54) UPPER SPREADER GUIDE DEVICE

(71) Applicant: KOBELCO CONSTRUCTION MACHINERY CO., LTD., Hiroshima (JP)

(72) Inventors: Shingo Kurihara, Hyogo (JP); Eiji Miya, Hyogo (JP); Koji Nishijima, Hyogo (JP); Takao Eto, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 217 days.

(21) Appl. No.: 18/261,760

(22) PCT Filed: Jan. 20, 2022

(86) PCT No.: PCT/JP2022/002039
§ 371 (c)(1),
(2) Date: Jul. 17, 2023

(87) PCT Pub. No.: WO2022/163500
PCT Pub. Date: Aug. 4, 2022

(65) Prior Publication Data
US 2024/0083719 A1 Mar. 14, 2024

(30) Foreign Application Priority Data
Jan. 26, 2021 (JP) ................................ 2021-010512

(51) Int. Cl.
*B66C 23/82* (2006.01)

(52) U.S. Cl.
CPC ................................ *B66C 23/821* (2013.01)

(58) Field of Classification Search
CPC ......... B66C 23/06; B66C 23/62; B66C 23/64; B66C 23/68; B66C 23/26; B66C 23/82; B66C 23/821; B66C 23/823; B66C 23/825; B66C 23/826; B66C 23/828
USPC ........................................................ 212/347
See application file for complete search history.

(56) References Cited

U.S. PATENT DOCUMENTS 4,353,471 A 10/1982 Palmer

FOREIGN PATENT DOCUMENTS

JP S5995083 U * 6/1984
JP S59179882 U * 12/1984
JP S6082597 A * 5/1985
JP S6146990 U * 3/1986
(Continued)

OTHER PUBLICATIONS

International Search Report Issued Mar. 1, 2022, in PCT/JP2022/002039, filed on Jan. 20, 2022, 2 pages.

*Primary Examiner* — Anna M Momper
*Assistant Examiner* — Henrix Soto
(74) *Attorney, Agent, or Firm* — Oblon, McClelland, Maier & Neustadt, L.L.P.

(57) ABSTRACT

An upper spreader guide device includes a pair of left and right boom-side guide parts each supported by a boom so as to be arranged in a raised attitude of rising diagonally upward from the boom in a state where the boom is arranged in a lowered attitude, and a pair of left and right movable guide parts supported by the pair of boom-side guide parts, respectively, such that a relative position with respect to the pair of boom-side guide parts is changeable between a protruding position and a retraction position.

4 Claims, 8 Drawing Sheets

(56) References Cited

FOREIGN PATENT DOCUMENTS

| | | | | |
|---|---|---|---|---|
| JP | 63-13989 | U | | 1/1988 |
| JP | 5-186185 | A | | 7/1993 |
| JP | 2001010782 | A | * | 1/2001 |
| JP | 2002-179388 | A | | 6/2002 |
| JP | 2003341980 | A | * | 12/2003 |
| JP | 2017218309 | A | * | 12/2017 |
| JP | 2018020902 | A | * | 2/2018 |
| JP | 2020-29348 | A | | 2/2020 |

* cited by examiner

UPPER SPREADER GUIDE DEVICE

TECHNICAL FIELD

The present disclosure relates to an upper spreader guide device located on a boom of a crane.

BACKGROUND ART

A so-called gantry crane includes a base body, a boom attached to the base body so as to be raised and lowered, a gantry attached to the base body behind the boom, and a connection unit connecting the gantry and a distal end portion of the boom. The connection unit is provided for raising and lowering the boom. Specifically, the connection unit includes, for example, a lower spreader, an upper spreader, a raising rope, and a guy line. The lower spreader is attached to an upper end portion of the gantry. The guy line connects the upper spreader and an upper end portion of the boom. The raising rope connects the upper spreader and the lower spreader such that a distance between the upper spreader and the lower spreader can be adjusted. When crane work of lifting a lifting load is performed, the connection unit is stretched between, for example, the upper end portion of the gantry and the distal end portion of the boom.

In a case of a crawler crane, the base body includes a lower travelling body capable of self-travelling, and an upper slewing body turnably supported by the lower travelling body. In a case of a fixed crane, the base body includes a foundation fixed to the ground or the like, and an upper slewing body turnably supported by the foundation. Cranes such as a crawler crane and a fixed crane are incapable of self-travelling on a public road, and are therefore transported to a destination by a trailer. When the crane is transported, the crane is disassembled into a plurality of parts so that a size of a transportation object making up a part of the crane falls within a restriction value range for transportation. For example, a transportation object including a boom is transported in a state where an upper spreader is attached to a predetermined attachment position at the boom. Therefore, when the transportation object is transported after the crane work, attachment work for attaching the upper spreader to the attachment position at the boom is performed.

Patent Literature 1 discloses an upper spreader attachment device including a pair of left and right guide parts. The left and right guide parts have a shape extending diagonally upward from a boom disposed in a lowered state, and can guide an upper spreader downward. The left and right guide parts are rotatably supported by the boom, whereby an attitude each of the left and right guide parts can be changed between a raised attitude and a lowered attitude.

In this attachment work, a worker arranges the boom in the lowered state, and lowers an upper spreader toward the boom by increasing an interval between the lower spreader and the upper spreader. The lowered upper spreader is guided by left and right guide parts and arranged at the attachment position. After the attachment work is completed, in order to keep a vertical dimension of a transportation object including the boom within a height limit at the time of transportation, the worker performs work for rotating the left and right guide parts around a rotation center so that each of the left and right guide parts changes from a raised attitude to a lowered attitude. This work enables reduction of a protrusion length of the left and right guide parts protruding upward from the boom arranged in the lowered state.

Meanwhile, when a crane is increased in size, the following problems occur. A boom length is increased as the crane increases in size. When the boom length is increased, a distance between an upper end portion of a gantry and a distal end portion of the boom is also increased, resulting in increasing a length of the connection unit. When the length of the connection unit is increased, a fluctuation range of a position of an upper spreader in a front-rear direction increases when the upper spreader is lowered toward the boom. Therefore, it is necessary to increase lengths of the left and right guide parts. However, when the guide parts are increased in size, the guide parts are increased in weight, so that it becomes difficult for a small number of people to perform the above-described work for reducing a protrusion length of the guide parts from the boom.

CITATION LIST

Patent Literature

Patent Literature 1: JP 2020-29348 A

SUMMARY OF INVENTION

The present disclosure has been made in view of the above problem, and it is an object of the present disclosure to provide an upper spreader guide device that enables a small number of people to perform work for reducing a protrusion length of a guide part from a boom while securing a length of the guide part.

In a crane including: a base body; a boom supported by the base body so as to be raised and lowered; a gantry supported by the base body; and a connection unit that connects the gantry and a distal end portion of the boom, the connection unit including a lower spreader and an upper spreader, there is provided an upper spreader guide device for guiding, to an attachment position at the boom, the upper spreader that is lowered by an increase in a distance between the lower spreader and the upper spreader in a state where the boom is arranged in a lowered attitude in which the boom is laid down. The upper spreader guide device includes: a pair of left and right boom-side guide parts each supported by the boom so as to be arranged in a raised attitude of rising diagonally upward from the boom in a state where the boom is arranged in the lowered attitude; and a pair of left and right movable guide parts respectively supported by the pair of boom-side guide parts such that a relative position with respect to the pair of boom-side guide parts is changeable between a protruding position and a retraction position. The protruding position of each of the pair of movable guide parts is a position at which the movable guide part is arranged in a raised attitude of rising diagonally upward from the boom-side guide part along a rising direction in which the boom-side guide part rises in a state where the boom is arranged in the lowered attitude and the boom-side guide part is arranged in the raised attitude, and the retraction position of each of the pair of movable guide parts is a position at which the movable guide part is arranged at a position lower than the protruding position in a state where the boom is arranged in the lowered attitude and the boom-side guide part is arranged in the raised attitude.

DESCRIPTION OF EMBODIMENT

In the following, an upper spreader guide device according to an embodiment and a crane including the same will be described with reference to the drawings.

Figure 1:
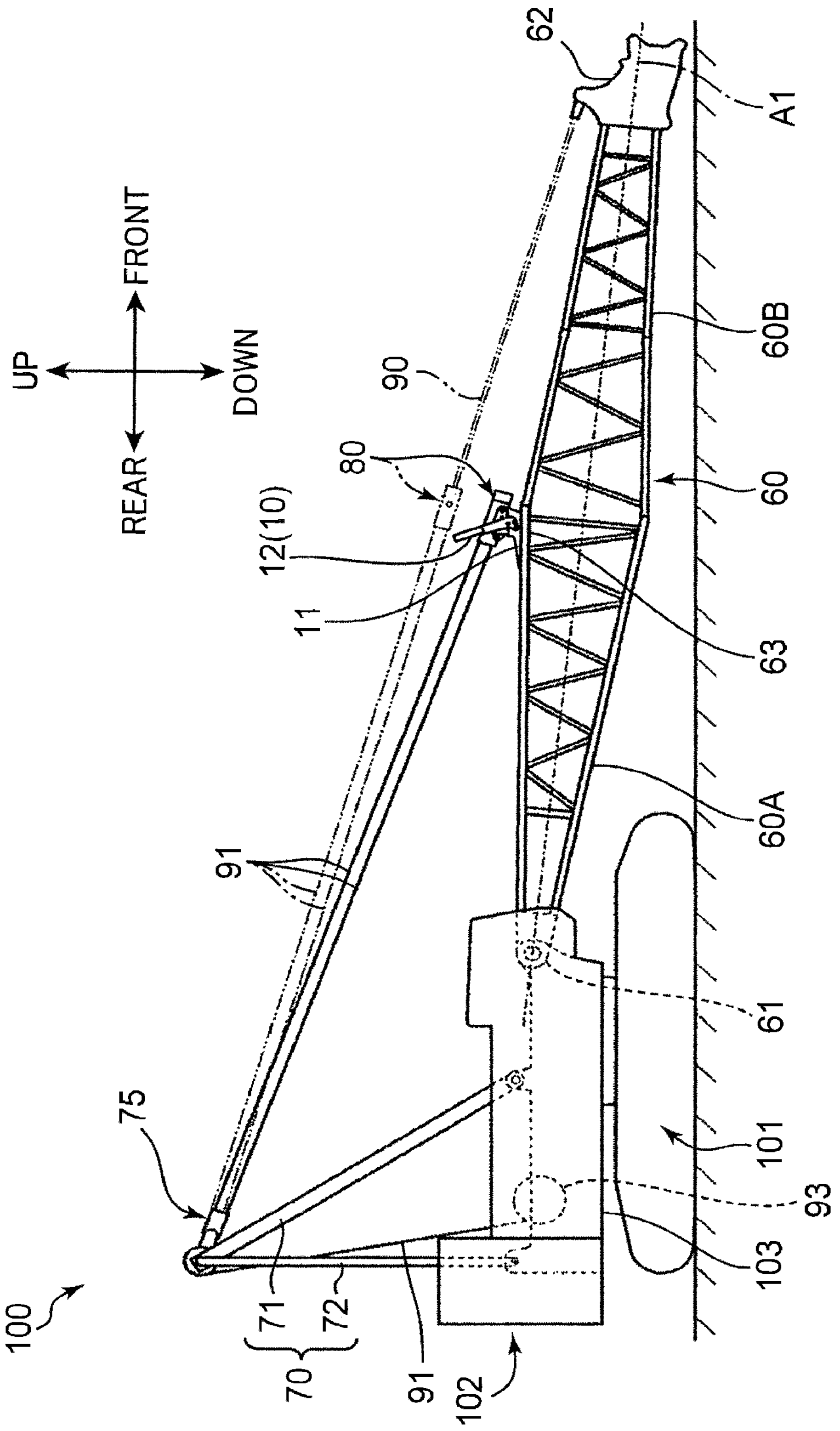
FIG. 1 is a side view of a crane including an upper spreader guide device according to an embodiment.

FIG. 1 is a side view of a crane 100 according to an embodiment. As illustrated in FIG. 1, the crane 100 includes a lower travelling body 101, an upper slewing body 102, a boom 60, a gantry 70, a lower spreader 75, an upper spreader 80, a guy line 90, a raising rope 91, a boom raising winch 93, an upper spreader guide device 10, and a plurality of fixing members. The lower travelling body 101 and the upper slewing body 102 are examples of a base body.

Directions of "up", "down", "front", "rear", "left", and "right" illustrated in the drawings are based on orientation of the upper slewing body 102 of the crane 100. These directions are shown for convenience sake in order to describe the crane 100 according to the embodiment, and do not limit a moving direction, a mode of use, and the like of the crane 100.

The lower travelling body 101 has a pair of left and right travelling devices. The upper slewing body 102 has a slewing frame 103 turnably supported on the lower travelling body 101. A cabin is located at a front portion of the slewing frame 103, and a counterweight is located at a rear portion of the slewing frame 103.

The boom 60 is supported by the upper slewing body 102 so as to be raised and lowered. The boom 60 has a proximal end portion 61 rotatably attached to the front portion of the slewing frame 103 of the upper slewing body 102. The boom 60 has a distal end portion 62 having a boom sheave (not illustrated), with a wire rope arranged to hang down from the distal end portion 62 via the boom sheave, the wire rope being for lifting a lifting load. The boom 60 extends in a longitudinal direction A1 from the proximal end portion 61 to the distal end portion 62. A jib (not illustrated) may be further coupled to the distal end portion 62 of the boom 60.

The boom 60 is configured with a plurality of boom members. In the specific example illustrated in FIG. 1, the boom 60 includes a lower boom member 60A and an upper boom member 60B coupled to the lower boom member 60A. Although in the present embodiment, the boom 60 is a lattice boom having a lattice structure, the boom may be an extendable telescopic boom.

The gantry 70, the lower spreader 75, the upper spreader 80, the guy line 90, the raising rope 91, and the raising winch 93 constitute a boom raising and lowering device that raises and lowers the boom 60 with respect to the upper slewing body 102. The lower spreader 75, the upper spreader 80, the guy line 90, and the raising rope 91 constitute a connection unit that connects an upper end portion of the gantry 70 and the distal end portion 62 of the boom 60.

The gantry 70 is attached to the upper slewing body 102 and is also referred to as an A frame. The gantry 70 is arranged behind the boom 60. The gantry 70 includes a compression member 71 and a tension member 72.

The compression member 71 is attached to the upper slewing body 102 so as to be raised and lowered. The compression member 71 is detachably attached to the upper slewing body 102 via a pin. When the crane work, which is work of lifting a lifting load, is performed, the compression member 71 is arranged to extend rearward and upward from a lower end portion of the compression member 71 toward an upper end portion of the compression member 71. When disassembling and assembling the crane 100, the compression member 71 may assume a lowered attitude. The compression member 71 includes, for example, two structures arranged at intervals in a left-right direction. The tension member 72 connects the upper end portion of the compression member 71 and the upper slewing body 102. The tension member 72 includes, for example, two members arranged at intervals in the left-right direction.

The lower spreader 75 is connected to the upper end portion of the compression member 71 of the gantry 70. The lower spreader 75 includes a plurality of lower spreader sheaves (not illustrated). The plurality of lower spreader sheaves are pulleys on which the raising rope 91 is hung.

The guy line 90 connects the upper spreader 80 and the distal end portion 62 of the boom 60 when the crane work is performed. The guy line 90 may be removed from the upper spreader 80 when the crane 100 is disassembled.

The boom raising winch 93 takes up and draws out the raising rope 91. The boom raising winch 93 may be attached to the upper slewing body 102 or may be attached to the compression member 71.

The raising rope 91 is pulled out from the raising winch 93 and wound around the lower spreader 75 and the upper spreader 80. The raising rope 91 has a distal end portion fixed at a predetermined position. When the boom raising winch 93 takes up or draws out the raising rope 91, a distance between the lower spreader 75 and the upper spreader 80 changes. Since the upper spreader 80 and a distal end portion of the boom 60 are connected by the guy line 90 when the crane work is performed, when the distance between the lower spreader 75 and the upper spreader 80 changes, the boom 60 is raised and lowered with respect to the upper slewing body 102.

Figure 2:
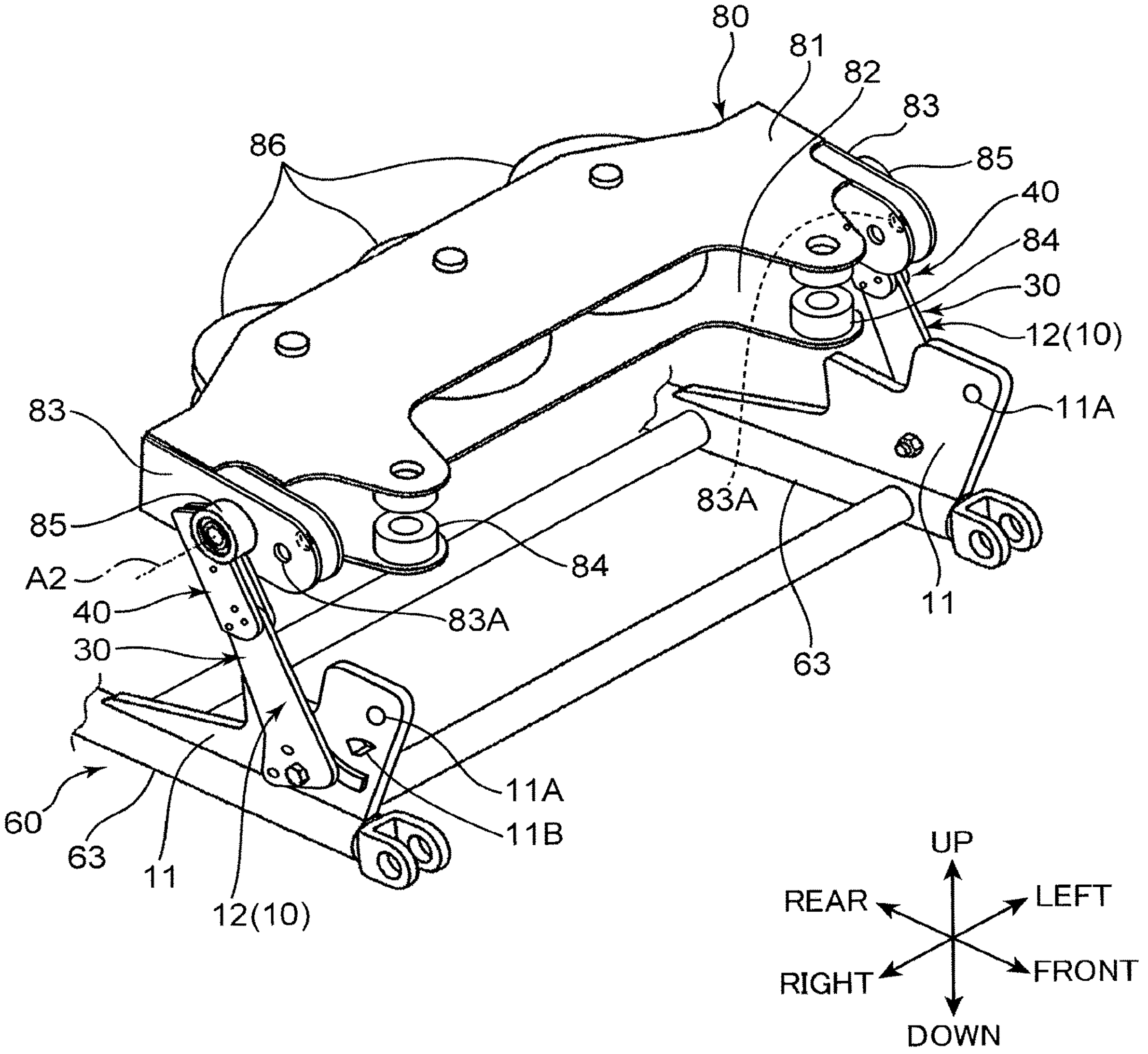
FIG. 2 is a perspective view illustrating a boom, the upper spreader guide device, and an upper spreader in the crane.
Figure 3:
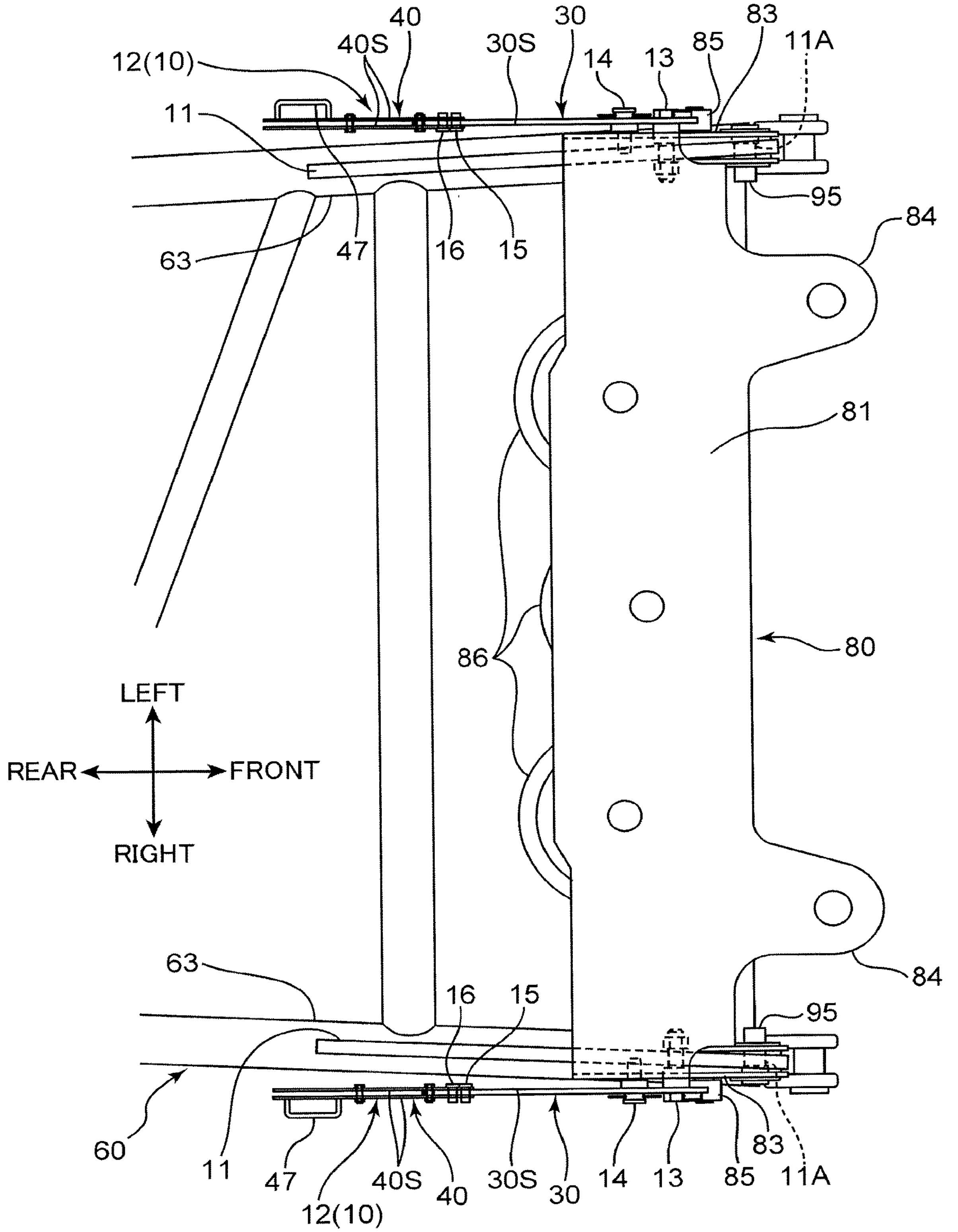
FIG. 3 is a plan view illustrating a state in which the upper spreader is attached to an attachment position at the boom.
Figure 4:
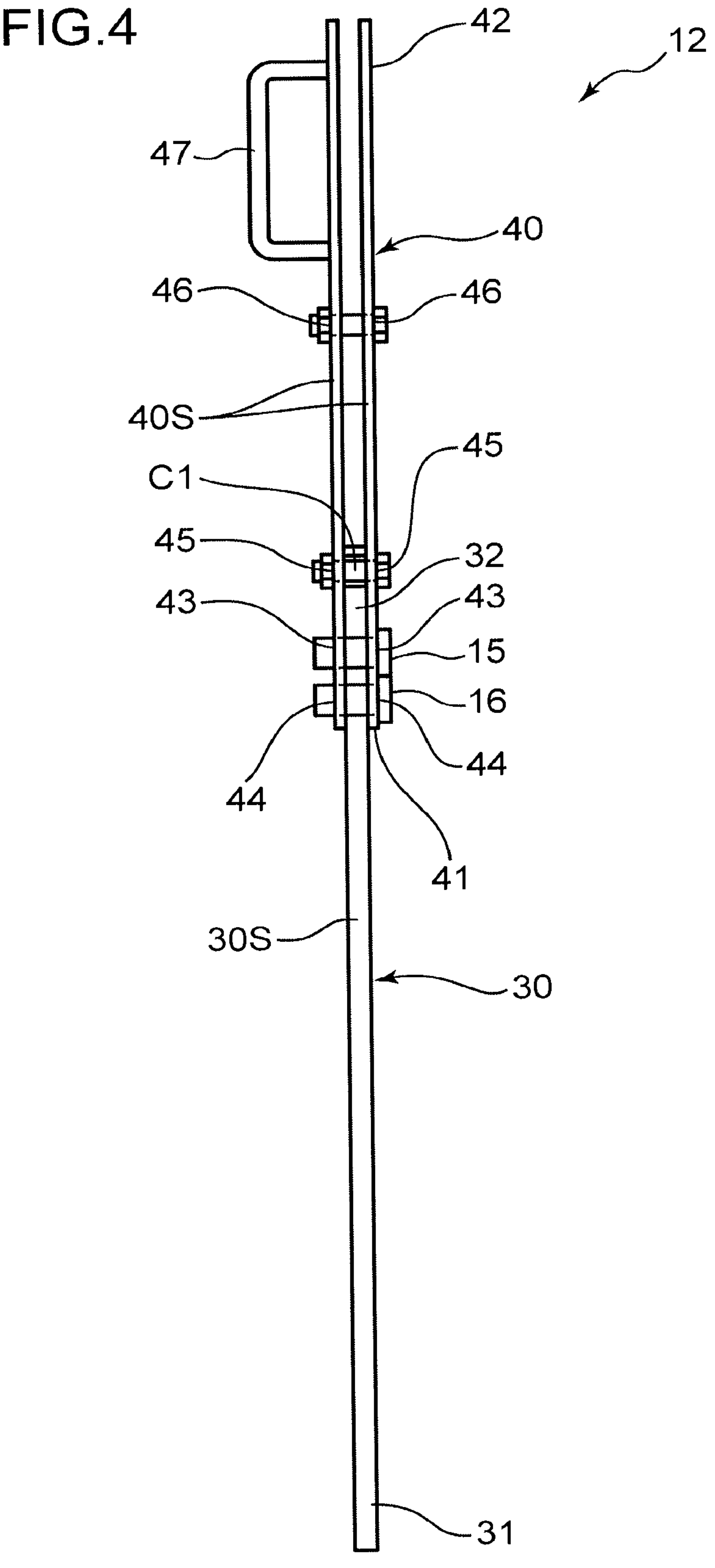
FIG. 4 is a plan view illustrating a boom-side guide part and a movable guide part of the upper spreader guide device.
Figure 5:
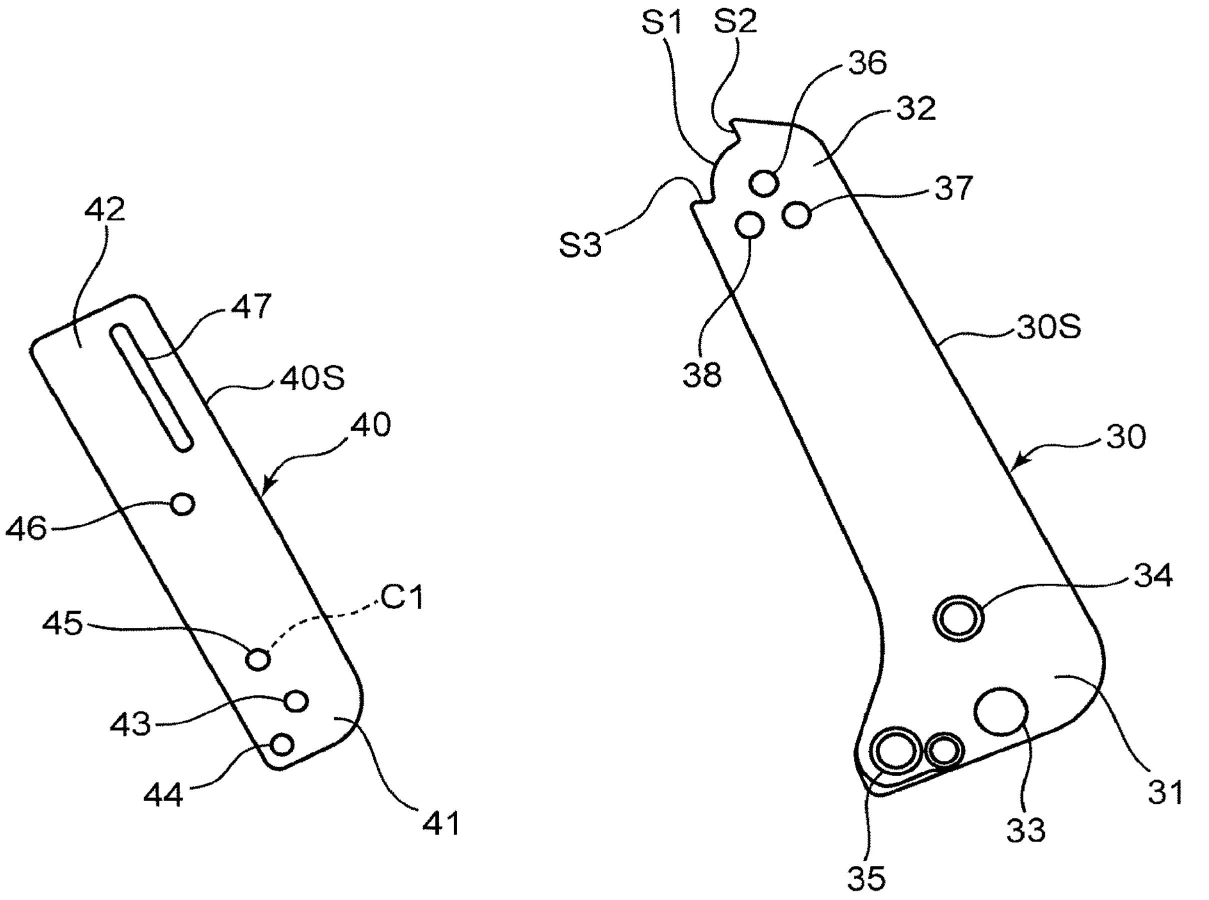
FIG. 5 is an exploded side view illustrating the boom-side guide part and the movable guide part.
Figure 6:
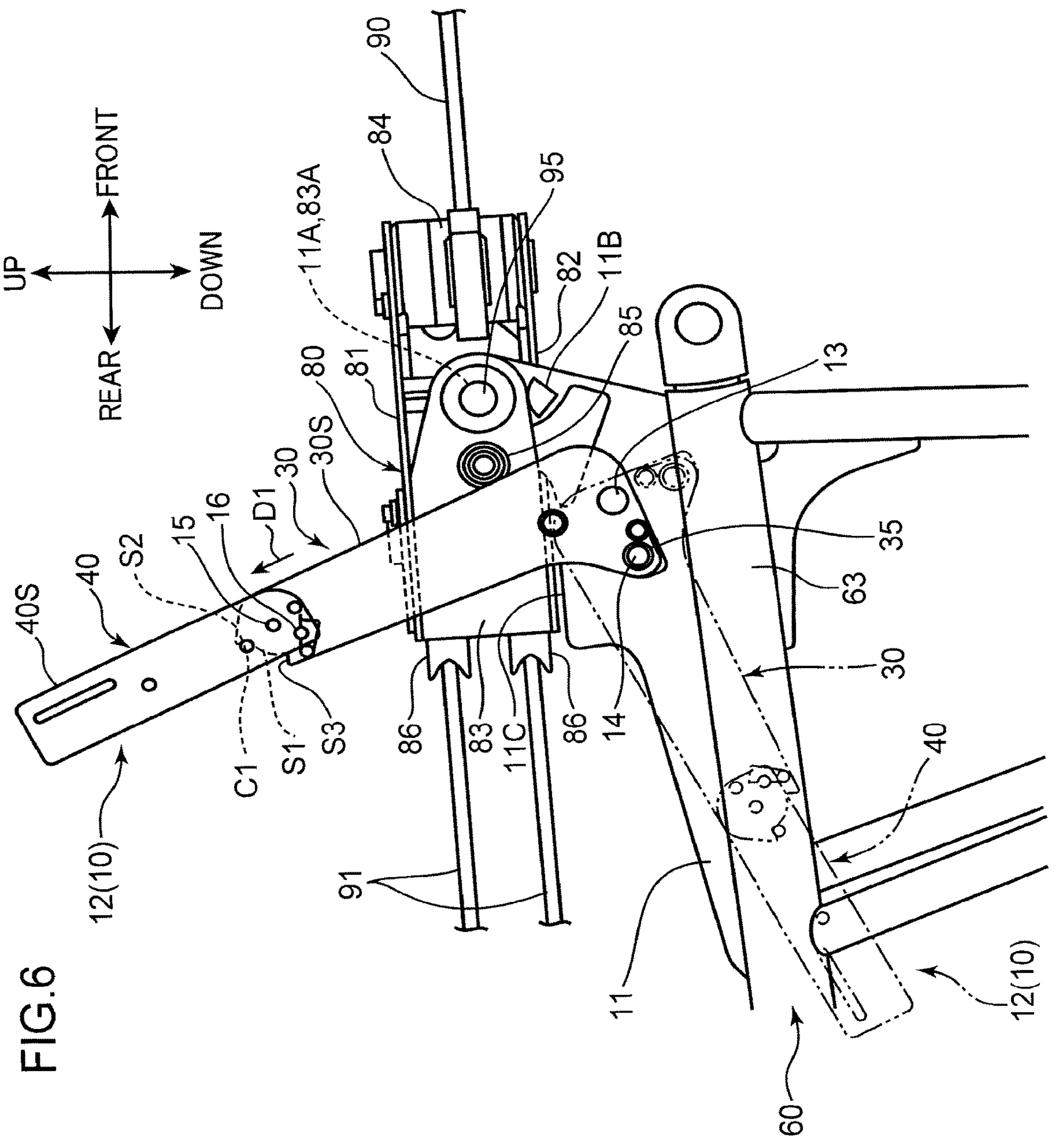
FIG. 6 is a side view illustrating a state in which the upper spreader is attached to the attachment position at the boom.
Figure 7:
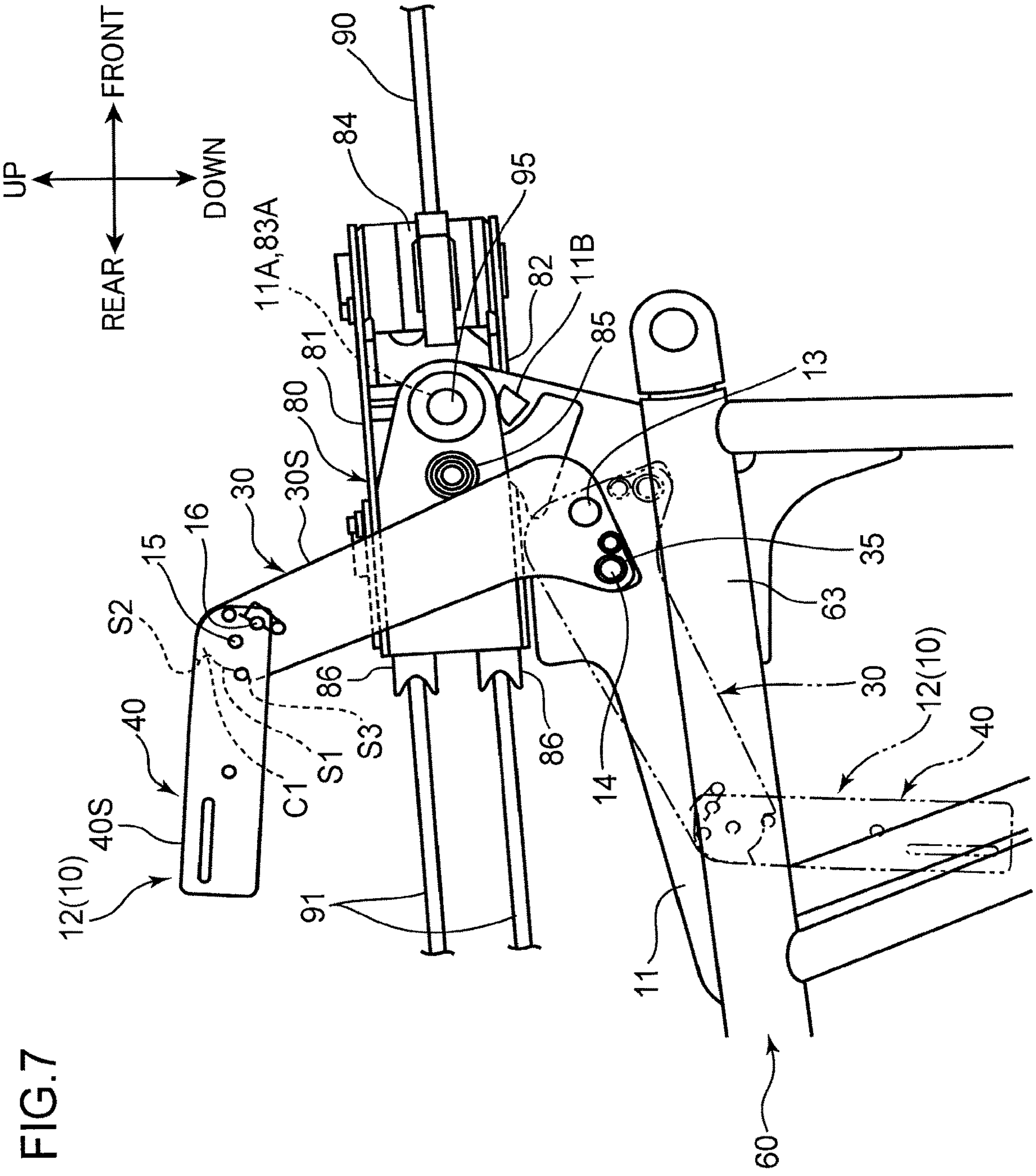
FIG. 7 is a side view illustrating a state in which the upper spreader is attached to the attachment position at the boom.

FIG. 2 is a perspective view illustrating the boom 60, the upper spreader guide device 10, and the upper spreader 80. FIG. 3 is a plan view illustrating a state in which the upper spreader 80 is attached at an attachment position at the boom 60. FIG. 4 is a plan view illustrating a boom-side guide part and a movable guide part of the upper spreader guide device 10. FIG. 5 is an exploded side view illustrating the boom-side guide part and the movable guide part. FIGS. 6 and 7 are side views illustrating a state in which the upper spreader 80 is attached to the attachment position at the boom 60.

As illustrated in FIGS. 1 to 3, the boom 60 has a left support part 11 and a right support part 11. The left support part 11 and the right support part 11 are parts that support the upper spreader guide device 10, and are located apart from each other in the left-right direction. The left support part 11 and the right support part 11 are brackets to which the upper spreader 80 is attached. In other words, the attachment position at the boom 60 is a position corresponding to the left support part 11 and the right support part 11. In the present embodiment, the left support part 11 and the right support part 11 are located at an intermediate portion between the proximal end portion 61 and the distal end portion 62 of the boom 60. In the present embodiment, the left support part 11 and the right support part 11 are located in the vicinity of a connection portion between the lower boom member 60A and the upper boom member 60B, specifically, above a distal end portion of the lower boom member 60A. Note that a part of the boom 60 where the left support part 11 and the right support part 11 are located is not limited to the specific example illustrated in FIG. 1.

The left support part 11 is a plate-like member having a shape rising upward from a left side main pipe 63 extending along the longitudinal direction A1 of the boom 60. The right support part 11 is a plate-like member having a shape rising upward from a right side main pipe 63 extending along the longitudinal direction A1 of the boom 60.

The upper spreader guide device 10 is a device for guiding the upper spreader 80 in attachment work of attaching the upper spreader 80 to the attachment position at the boom 60. The upper spreader guide device 10 facilitates attachment of the upper spreader 80 to the boom 60. The upper spreader guide device 10 includes a left spreader guide 12 and a right spreader guide 12. Details of these spreader guides 12 will be described later.

The plurality of fixing members include a pair of left and right attachment pins 95 illustrated in FIG. 3. These attachment pins 95 fix the upper spreader 80 arranged at the attachment position to the left support part 11 and the right support part 11. Each of the left support part 11 and the right support part 11 has an insertion hole 11A through which the attachment pin 95 is inserted. As illustrated in FIGS. 2 and 6, each of the left support part 11 and the right support part 11 has a protrusion 11B and a support surface 11C for supporting the upper spreader 80 arranged at the attachment position from below.

The upper spreader 80 includes an upper frame 81, a lower frame 82, a pair of left and right frames 83, a guy line connecting part 84, a left guided part 85 and a right guided part 85, and a plurality of upper spreader sheaves 86. Each of the pair of left and right frames 83 has an insertion hole 83A through which the attachment pin 95 is inserted.

The upper frame 81 and the lower frame 82 are plate-like members vertically opposed to each other, and rotatably support the plurality of upper spreader sheaves 86. The right frame 83 is a plate-like member vertically connecting a right side end of the upper frame 81 and a right side end of the lower frame 82. The left frame 83 is a plate-like member vertically connecting a left side end of the upper frame 81 and a left side end of the lower frame 82. One end of the guy line 90 is connected to the guy line connecting part 84. The guy line connecting part 84 includes a pin hole into which, for example, a pin (not illustrated) for attaching the guy line 90 can be inserted.

The left guided part 85 and the right guided part 85 are parts guided by the left spreader guide 12 and the right spreader guide 12. The left guided part 85 and the right guided part 85 are located at positions separated from each other in the left-right direction. The left guided part 85 and the right guided part 85 may be, for example, rollers respectively supported by the left frame 83 and the right frame 83 so as to be rotatable around a rotation axis A2 (see FIG. 2) in the left-right direction.

The left spreader guide 12 is a member for guiding the left guided part 85 of the upper spreader 80 diagonally downward, and the right spreader guide 12 is a member for guiding the right guided part 85 of the upper spreader 80 diagonally downward. The left spreader guide 12 includes a boom-side guide part 30 and a movable guide part 40. Similarly, the right spreader guide 12 includes a boom-side guide part 30 and a movable guide part 40. The left spreader guide 12 and the right spreader guide 12 have the same structure except that the left and right directions are reversed. In the following, the boom-side guide part 30 and the movable guide part 40 of the left spreader guide 12 may be referred to as a left boom-side guide part 30 and a left movable guide part 40, respectively, and the boom-side guide part 30 and the movable guide part 40 of the right spreader guide 12 may be referred to as a right boom-side guide part 30 and a right movable guide part 40, respectively.

The left spreader guide 12 and the right spreader guide 12 are plate-like members extending diagonally upward from the left support part 11 and the right support part 11, respectively. In each of the left spreader guide 12 and the right spreader guide 12, a ratio between a length of the boom-side guide part 30 and a length of the movable guide part 40 is determined according to specifications of the crane 100 in consideration of workability of work of rotating each movable guide part 40, height positions of the left and right spreader guides 12 when each movable guide part 40 is arranged at a retraction position, and the like, and the ratio is not particularly limited.

As illustrated in FIG. 1, the right boom-side guide part 30 is supported by the right support part 11 so as to be arranged in a raised attitude of rising diagonally upward on the rear side from the right support part 11 of the boom 60 in a state where the boom 60 is arranged in the lowered attitude. The right movable guide part 40 is supported by the right boom-side guide part 30 such that a relative position with respect to the right boom-side guide part 30 is changeable between a protruding position illustrated in FIG. 6 and the retraction position illustrated in FIG. 7.

The left boom-side guide part 30 is supported by the left support part 11 so as to be arranged in the raised attitude of rising diagonally upward on the rear side from the left support part 11 of the boom 60 in a state where the boom 60 is arranged in the lowered attitude. The left movable guide part 40 is rotatably supported by the left boom-side guide part 30 such that a relative position with respect to the left boom-side guide part 30 is changeable between the protruding position and the retraction position similarly to the right movable guide part 40. The left and right movable guide parts 40 are respectively supported by the left and right boom-side guide parts 30 so as to be rotatable around a rotation axis extending along the left-right direction.

The protruding position of each of the left and right movable guide parts 40 is a position at which each of the left and right movable guide parts 40 is arranged in the raised attitude of rising diagonally upward from its corresponding boom-side guide part 30 along a rising direction D1 (see FIG. 6) in which the left and right boom-side guide parts 30 are raised in a state where the boom 60 is arranged in the lowered attitude, and the left and right boom-side guide parts 30 are arranged in the raised attitude.

The retraction position of each of the left and right movable guide parts 40 is a position at which each of the left and right movable guide parts 40 is arranged at a lower position indicated by a solid line in FIG. 7 than the protruding position indicated by a solid line in FIG. 6 in a state where the boom 60 is arranged in the lowered attitude and the left and right boom-side guide parts 30 are arranged in the raised attitude. In other words, the retraction position of each of the left and right movable guide parts 40 is a position at which, in a state where the boom 60 is arranged in the lowered attitude and the left and right boom-side guide parts 30 are arranged in the raised attitude, a dimension of upward protrusion of each of the left and right movable guide parts 40 from the boom-side guide part 30 is smaller than that at the protruding position.

In the upper spreader guide device 10, when the attachment work of attaching the upper spreader 80 to the attachment position at the boom 60 is performed, the left movable guide part 40 and the right movable guide part 40 are arranged at the protruding position as illustrated in FIG. 6. This enables lengths of the left and right spreader guides 12 to be secured, the spreader guides extending diagonally upward from the left support part 11 and the right support part 11 of the boom 60, respectively.

In this attachment work, a worker arranges the boom 60 in the lowered state, and lowers the upper spreader 80 toward the boom 60 from a position indicated by a chain double-dashed line in FIG. 1 by increasing the interval between the lower spreader 75 and the upper spreader 80. The lowered upper spreader 80 is guided by the left and right spreader guides 12 and arranged at the attachment position. Specifically, the left guided part 85 is guided diagonally downward while coming into contact with the left movable guide part 40 and the left boom-side guide part 30 in this order, and the right guided part 85 is guided diagonally downward while coming into contact with the right movable guide part 40 and the right boom-side guide part 30 in this order. This enables the upper spreader 80 to be moved to the attachment position at the boom 60.

After the attachment work is completed, the worker can reduce a vertical dimension of the left and right spreader guides 12 only by moving the left movable guide part 40 and the right movable guide part 40 from the protruding position to the retraction position without moving the entire left and right spreader guides 12. Accordingly, these works can be performed by a small number of people (e.g., one person). In this work, the worker can move the left movable guide part 40 and the right movable guide part 40 while holding a handle 47, which will be described later, provided in each of the left movable guide part 40 and the right movable guide part 40.

In a case, for example, where the boom 60 has a large height, it may be necessary to further lower the height positions of the left and right spreader guides 12 in order to keep a height of a transportation object including the boom 60, the upper spreader guide device 10, and the upper spreader 80 during transportation within a height limit. In addition, although it is preferable to use a low-floor trailer having a low cargo bed as a trailer for transporting a transportation object, in a case where a common trailer having a cargo bed with a height larger than that of the low-floor trailer is used as the trailer, it may be necessary to further lower the height positions of the left and right spreader guides 12. Even in these cases, since the left and right spreader guides 12 according to the present embodiment have the following configuration, the vertical dimension of the left and right spreader guides 12 can be further reduced.

In other words, the right boom-side guide part 30 is rotatably supported by the right support part 11 such that a relative position with respect to the right support part 11 of the boom 60 is changeable between a rising position indicated by the solid line in FIGS. 6 and 7 and a non-rising position indicated by a chain double-dashed line in FIGS. 6 and 7. Similarly, the left boom-side guide part 30 is rotatably supported by the left support part 11 such that a relative position with respect to the left support part 11 of the boom 60 is changeable between the rising position and the non-rising position.

The rising position of each of the left and right boom-side guide parts 30 is a position when each of the left and right boom-side guide parts 30 is arranged in the raised attitude of rising diagonally upward from the corresponding support part 11 of the boom 60 as indicated by the solid line in FIGS. 6 and 7 in a state where the boom 60 is arranged in the lowered attitude.

The non-rising position of each of the left and right boom-side guide parts 30 is a position at which each of the left and right boom-side guide parts 30 is arranged at a lower position indicated by the chain double-dashed line in FIGS. 6 and 7 than the rising position indicated by the solid line in FIGS. 6 and 7 in a state where the boom 60 is arranged in the lowered attitude. In other words, the non-rising position of each of the left and right boom-side guide parts 30 is a position at which, in a state where the boom 60 is arranged in the lowered attitude, each of the left and right boom-side guide parts 30 has a dimension of upward protrusion from the corresponding support part 11 of the boom 60 becomes smaller than that at the rising position. Accordingly, in the present embodiment, by rotating the left and right boom-side guide parts 30 with respect to the left support part 11 and the right support part 11 of the boom 60, respectively, so as to be arranged at the non-rising position, it is possible to further reduce the dimension of upward protrusion of each of the left and right spreader guides 12 from the left support part 11 and the right support part 11, respectively.

The structure of the upper spreader guide device 10 according to the present embodiment is approximately as described above. In the following, the structure of the left and right spreader guides 12 will be described more specifically.

As illustrated in FIGS. 3 to 7, the left movable guide part 40 and the right movable guide part 40 each have a movable part guide surface 40S, and the left boom-side guide part 30 and the right boom-side guide part 30 each have a boom-side guide surface 30S.

The movable part guide surfaces 40S of the left and right movable guide parts 40 are surfaces capable of guiding the left and right guided parts 85 of the upper spreader 80 diagonally downward to the boom-side guide surfaces 30S of the left and right boom-side guide parts 30, respectively, while the left and right guided parts 85 are in contact with the movable part guide surfaces 40S in the attachment work state indicated by the solid line in FIG. 6. The attachment work state is a state in which the boom 60 is arranged in the lowered attitude, each of the left and right boom-side guide parts 30 is arranged in the raised attitude, and each of the left and right movable guide parts 40 is arranged at the protruding position (in the raised attitude).

The boom-side guide surfaces 30S of the left and right boom-side guide parts 30 are surfaces capable of guiding the left and right guided parts 85 of the upper spreader 80 diagonally downward to move the upper spreader 80 to the attachment position while the left and right guided parts 85 are in contact with boom-side guide surfaces 30S in the attachment work state.

As described in the foregoing, the left guided part 85 and the right guided part 85 of the upper spreader 80 are guided diagonally downward while being in contact with the movable part guide surfaces 40S of the left and right movable guide parts 40, and are guided diagonally downward while being in contact with the boom-side guide surfaces 30S of the left and right boom-side guide parts 30, so that the worker can stably move the upper spreader 80 to the attachment position at the boom 60.

In the present embodiment illustrated in FIGS. 4 and 6, the boom-side guide surface 30S of the right boom-side guide part 30 and the movable part guide surface 40S of the right movable guide part 40 are provided so as to be continuous from a lower end portion to an upper end portion of the right spreader guide 12 in the attachment work state. Similarly, the boom-side guide surface 30S of the left boom-side guide part 30 and the movable part guide surface 40S of the left movable guide part 40 are provided so as to be continuous from a lower end portion to an upper end portion of the left spreader guide 12 in the attachment work state.

As illustrated in FIGS. 4 and 5, in the left and right spreader guides 12, each of the left boom-side guide part 30 and the right boom-side guide part 30 is formed of a single plate-like member. By contrast, in the left and right spreader guides 12, each of the left movable guide part 40 and the right movable guide part 40 includes two plate-like members, a contact part Cl arranged between the two plate-like members, and a plurality of fastening members 45 and 46. The contact part Cl serves as a spacer for determining a distance between the two plate-like members. Each of the plurality of fastening members 45 and 46 is configured with, for example, a bolt and a nut.

As illustrated in FIGS. 3, 6, and 7, the left spreader guide 12 further includes an attachment member 13 for rotatably attaching the left boom-side guide part 30 to the left support part 11 of the boom 60, a positioning member 14 for positioning the relative position of the left boom-side guide part 30 with respect to the left support part 11 of the boom 60 at the rising position or the non-rising position, an attachment member 15 for rotatably attaching the left movable guide part 40 to the left boom-side guide part 30, and a positioning member 16 for positioning the relative position of the left movable guide part 40 with respect to the left boom-side guide part 30 at the protruding position or the retraction position.

Similarly, the right spreader guide 12 further includes an attachment member 13 (see FIGS. 3, 6, and 7) for rotatably attaching the right boom-side guide part 30 to the right support part 11 of the boom 60, a positioning member 14 for positioning the relative position of the right boom-side guide part 30 with respect to the right support part 11 of the boom 60 at the rising position or the non-rising position, an attachment member 15 for rotatably attaching the right movable guide part 40 to the right boom-side guide part 30, and a positioning member 16 for positioning the relative position of the right movable guide part 40 with respect to the right boom-side guide part 30 at the protruding position or the retraction position.

As illustrated in FIG. 5, the right boom-side guide part 30 includes a proximal end portion 31 in which an insertion hole 33, an insertion hole 34, and an insertion hole 35 are formed, and a distal end portion 32 in which an insertion hole 36, an insertion hole 37, and an insertion hole 38 are formed. The attachment member 13 includes a bolt to be inserted through the insertion hole 33 of the right boom-side guide part 30 and an insertion hole (not illustrated) formed in a part of the right support part 11 corresponding to the insertion hole 33, and a nut screwed to the bolt. This makes the right boom-side guide part 30 to be rotatably supported by the right support part 11.

The insertion hole 34 and the insertion hole 35 are formed on a concentric circle around the insertion hole 33. The insertion hole 35 is a hole for positioning the right boom-side guide part 30 at the rising position, and the insertion hole 34 is a hole for positioning the right boom-side guide part 30 at the non-rising position. The positioning member 14 includes a pin. When positioning the right boom-side guide part 30 at the rising position, the pin of the positioning member 14 is inserted into the insertion hole 35 of the right boom-side guide part 30 and into the insertion hole (not illustrated) formed at the right support part 11. When positioning the right boom-side guide part 30 at the non-rising position, the pin of the positioning member 14 is inserted into the insertion hole 34 of the right boom-side guide part 30 and into the insertion hole formed at the right support part 11. Though not illustrated, similarly to the right boom-side guide part 30, the left boom-side guide part 30 includes a proximal end portion in which the insertion hole 33, the insertion hole 34, and the insertion hole 35 are formed, and a distal end portion in which the insertion hole 36, the insertion hole 37, and the insertion hole 38 are formed.

As illustrated in FIG. 5, the right movable guide part 40 includes a proximal end portion 41 in which an insertion hole 43 and an insertion hole 44 are formed, and a distal end portion 42 in which the handle 47 is formed. The attachment member 15 includes a pin. The pin of attachment member 15 is inserted into the insertion hole 43 of the right movable guide part 40 and the insertion hole 36 of the right boom-side guide part 30. This makes the right movable guide part 40 to be rotatably supported by the right boom-side guide part 30. The insertion hole 37 and the insertion hole 38 are formed on a concentric circle around the insertion hole 36. The insertion hole 38 is a hole for positioning the right movable guide part 40 at the protruding position, and the insertion hole 37 is a hole for positioning the right movable guide part 40 at the retraction position. The positioning member 16 includes a pin. When positioning the right movable guide part 40 at the protruding position, the pin of the positioning member 16 is inserted into the insertion hole 38 of the right boom-side guide part 30 and into the insertion hole 44 of the right movable guide part 40. When positioning the right movable guide part 40 at the retraction position, the pin of the positioning member 16 is inserted into the insertion hole 37 of the right boom-side guide part 30 and into the insertion hole 44 of the right movable guide part 40. Though not illustrated, similarly to the right movable guide part 40, the left movable guide part 40 includes a proximal end portion in which the insertion hole 43 and the insertion hole 44 are formed, and a distal end portion in which the handle 47 is formed.

As illustrated in FIGS. 5 to 7, the right boom-side guide part 30 includes a contact part guide surface S1, a protruding position restriction surface S2, and a retraction position restriction surface S3. The protruding position restriction surface S2 is a surface for restricting the right movable guide part 40 rotating toward the protruding position from exceeding the protruding position illustrated in FIG. 6 to stop the right movable guide part 40 at the protruding position. The retraction position restriction surface S3 is a surface for restricting the right movable guide part 40 rotating toward the retraction position from exceeding the retraction position illustrated in FIG. 7 to stop the right movable guide part 40 at the retraction position. The contact part guide surface S1 is an arc-shaped surface centered on the rotation center around which the right movable guide part 40 rotates. The contact part guide surface S1 extends in an arc shape so as to connect the protruding position restriction surface S2 and the retraction position restriction surface S3. The protruding position restriction surface S2 is an example of a first restriction part. The retraction position restriction surface S3 is an example of a second restriction part. Though not illustrated, the left boom-side guide part 30 includes the contact part guide surface S1, the protruding position restriction surface S2, and the retraction position restriction surface S3 similarly to the right boom-side guide part 30.

As illustrated in FIG. 5, in each of the right and left boom-side guide parts 30, the contact part guide surface S1, the protruding position restriction surface S2, and the retraction position restriction surface S3 are provided by forming a notch in a part of the distal end portion 32 of the boom-side guide part 30.

As illustrated in FIGS. 4 to 7, the contact part Cl of the right movable guide part 40 has a part that comes into contact with the protruding position restriction surface S2 when the right movable guide part 40 is arranged at the protruding position, and has a part that comes into contact with the retraction position restriction surface S3 when the right movable guide part 40 is arranged at the retraction position. Though not illustrated, the contact part Cl of the left movable guide part 40 has a part that comes into contact with the protruding position restriction surface S2 when the left movable guide part 40 is arranged at the protruding position, and has a part that comes into contact with the retraction position restriction surface S3 when the left movable guide part 40 is arranged at the retraction position. The part of the contact part Cl that comes into contact with the protruding position restriction surface S2 is an example of a first restricted part, and the part of the contact part Cl that comes into contact with the retraction position restriction surface S3 is an example of a second restricted part.

When the worker performs the work of rotating each of the left and right movable guide parts 40 toward the protruding position, contact of the contact part Cl with the protruding position restriction surface S2 enables each of the left and right movable guide parts 40 to be accurately arranged at the protruding position. Similarly, when the worker performs the work of rotating each of the left and right movable guide parts 40 toward the retraction position, contact of the contact part Cl with the retraction position restriction surface S3 enables each of the left and right movable guide parts 40 to be accurately arranged at the retraction position.

In a state where each of the left and right movable guide parts 40 is arranged at the retraction position, even if the worker is not supporting the movable guide part 40, each of the left and right movable guide parts 40 is supported by the retraction position restriction surface S3 of the corresponding boom-side guide part 30 and held at the retraction position. This improves workability. Each of the contact parts Cl of the left and right movable guide parts 40 moves along the contact part guide surface S1 between the protruding position restriction surface S2 and the retraction position restriction surface S3 when the movable guide part 40 rotates between the protruding position and the retraction position. This makes it possible to further stabilize respective operations of the left and right movable guide parts 40 that rotate between the protruding position and the retraction position.

Figure 8:
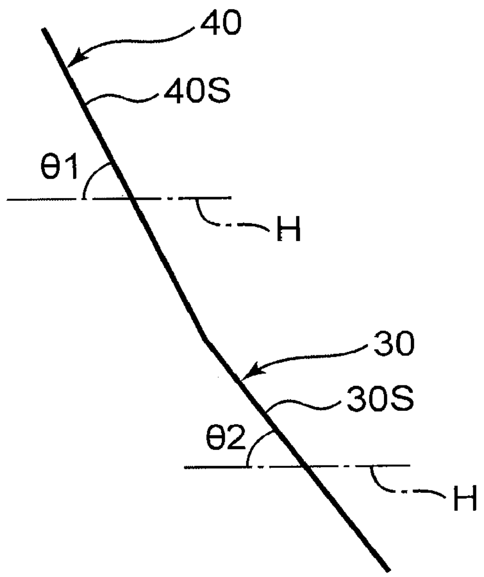
FIG. 8 is a schematic view illustrating an angle between a guide surface of the movable guide part and a horizontal plane and an angle between a guide surface of the boom-side guide part and the horizontal plane.

FIG. 8 is a schematic view illustrating an angle θ1 between the movable part guide surface 40S of the right movable guide part 40 and a horizontal plane H and an angle θ2 between the boom-side guide surface 30S of the right boom-side guide part 30 and the horizontal plane H. In the attachment work state, the angle θ1 formed by the movable part guide surface 40S and the horizontal plane H is preferably larger than the angle θ2 formed by the boom-side guide surface 30S and the horizontal plane H. Though not illustrated, similarly, an angle between the movable part guide surface 40S of the left movable guide part 40 and the horizontal plane is preferably larger than an angle between the boom-side guide surface 30S of the left boom-side guide part 30 and the horizontal plane. In this case, the left and right guided parts 85 of the upper spreader 80 that move diagonally downward while being in contact with the left and right movable part guide surfaces 40S, respectively, can smoothly move from the movable part guide surface 40S onto the boom-side guide surface 30S in the vicinity of a boundary between the movable part guide surface 40S and the boom-side guide surface 30S.

Specifically, not only when the upper spreader 80 moves diagonally downward while the left guided part 85 and the right guided part 85 maintain the same height, but also when the upper spreader 80 moves diagonally downward in a slightly inclined state while one of the left guided part 85 and the right guided part 85 is slightly lower than the other. In this case, when the movable part guide surface 40S and the boom-side guide surface 30S are arranged such that the angle θ1 is smaller than the angle θ2 (θ1<θ2), a difference in a relative position between the left guided part 85 and the right guided part 85 tends to increase in a front-rear direction. In other words, in a state where one of the left guided part 85 and the right guided part 85 is in contact with the boom-side guide surface 30S and the other is in contact with the movable part guide surface 40S in the vicinity of the boundary, the other guided part 85 may be relatively largely displaced to the rear side with respect to the one guided part 85. By contrast, when the movable part guide surface 40S and the boom-side guide surface 30S are arranged such that the angle θ1 is larger than the angle θ2 (θ1>θ2), even in a state where one of the left guided part 85 and the right guided part 85 is in contact with the boom-side guide surface 30S and the other is in contact with the movable part guide surface 40S in the vicinity of the boundary, the other guided part 85 is more suppressed from being displaced rearward with respect to the one guided part 85 than in the case of θ1<θ2. For the same reason, the left and right guided parts 85 that move diagonally upward while being in contact with the left and right boom-side guide surfaces 30S, respectively, can smoothly move from the boom-side guide surface 30S onto the movable part guide surface 40S in the vicinity of the boundary between the boom-side guide surface 30S and the movable part guide surface 40S.

In addition, in a state in which the boom 60 is arranged in the lowered attitude, each of the left and right boom-side guide parts 30 is arranged in the raised attitude, and each of the left and right movable guide parts 40 is arranged at the retraction position as indicated by the solid line in FIG. 7, it is preferable that the movable part guide surfaces 40S of the left and right movable guide parts 40 are arranged so as to be inclined downward (so as to be inclined downward to the right in FIG. 7) toward the boom-side guide surfaces 30S. In this case, when the attachment work is performed, the left and right movable guide parts 40 can guide the left and right guided parts 85 of the upper spreader 80 to the boom-side guide surfaces 30S even if the left and right movable guide parts are arranged at the retraction position.

The present disclosure is not limited to the embodiment described above. The present disclosure includes, for example, the following modes.

(A) Extending Direction of Spreader Guide

Although in the above embodiment, the left and right spreader guides 12 are inclined so as to extend diagonally upward on the rear side from the left and right support parts 11 of the boom 60, the left and right spreader guides may be inclined so as to extend diagonally upward on the front side from the left and right support parts 11 of the boom 60.

(B) Structures of Movable Guide Part and Boom-Side Guide Part

In the left and right spreader guides 12 according to the above embodiment, the left movable guide part 40 and the right movable guide part 40 are rotatably supported by the left boom-side guide part 30 and the right boom-side guide part 30 such that the relative positions with respect to the left boom-side guide part 30 and the right boom-side guide part 30 is changeable between the protruding position and the retraction position. Note that the structure for changing the relative positions of the left movable guide part 40 and the right movable guide part 40 between the protruding position and the retraction position is not limited to the above embodiment. For example, the structure may be a telescopic extendable structure in which one of the boom-side guide part and the movable guide part has a cylindrical shape, and the other is fitted into the cylindrical one. Alternatively, one of the left and right spreader guides 12 may have the movable guide part rotatably supported by the boom-side guide part, and the other of the left and right spreader guides 12 may have the above-described telescopic extendable structure.

(C) Restriction Part and Restricted Part

While in the above embodiment, each of the left and right boom-side guide parts 30 has the contact part guide surface S1, the protruding position restriction surface S2, and the retraction position restriction surface S3, and each of the left and right movable guide parts 40 has the contact part Cl, this arrangement may be reversed. In other words, each of the left and right movable guide parts 40 has the contact part guide surface S1, the protruding position restriction surface S2, and the retraction position restriction surface S3, and each of the left and right boom-side guide parts 30 has the contact part Cl. In this case, the protruding position restriction surface S2 is an example of the first restricted part, and the retraction position restriction surface S3 is an example of the second restricted part. In this case, a part of the contact part Cl contacting the protruding position restriction surface S2 is an example of the first restriction part, and a part of the contact part Cl contacting the retraction position restriction surface S3 is an example of the second restriction part. In addition, at least one of the contact part guide surface S1, the protruding position restriction surface S2, and the retraction position restriction surface S3 can be omitted.

(D) Boom-Side Guide Part

In the above embodiment, the left and right boom-side guide parts 30 are rotatably supported by the left support part 11 and the right support part 11, respectively, such that the relative position with respect to the left support part 11 and the right support part 11 of the boom 60 is changeable between the rising position and the non-rising position. Note that the left and right boom-side guide parts 30 may be fixed so as not to rotate with respect to the left support part 11 and the right support part 11 of the boom 60, and may be always arranged at the rising position.

(E) Crane Type

Although in the above embodiment, the crane is a mobile crane including a lower travelling body, it is not limited thereto, and may be a fixed type crane in which a boom is supported so as to be raised and lowered with respect to a foundation installed on the ground or the like. In this case, the foundation and the upper slewing body constitute a base body.

According to the present disclosure, there is provided an upper spreader guide device that enables a small number of people to perform work for reducing a protrusion length of a guide part from a boom while securing a length of the guide part.

In a crane including: a base body; a boom supported by the base body so as to be raised and lowered; a gantry supported by the base body; and a connection unit that connects the gantry and a distal end portion of the boom, the connection unit including a lower spreader and an upper spreader, there is provided an upper spreader guide device for guiding, to an attachment position at the boom, the upper spreader that is lowered by an increase in a distance between the lower spreader and the upper spreader in a state where the boom is arranged in a lowered attitude in which the boom is laid down. The upper spreader guide device includes: a pair of left and right boom-side guide parts each supported by the boom so as to be arranged in a raised attitude of rising diagonally upward from the boom in a state where the boom is arranged in the lowered attitude; and a pair of left and right movable guide parts respectively supported by the pair of boom-side guide parts such that a relative position with respect to the pair of boom-side guide parts is changeable between a protruding position and a retraction position. The protruding position of each of the pair of movable guide parts is a position at which the movable guide part is arranged in a raised attitude of rising diagonally upward from the boom-side guide part along a rising direction in which the boom-side guide part rises in a state where the boom is arranged in the lowered attitude and the boom-side guide part is arranged in the raised attitude, and the retraction position of each of the pair of movable guide parts is a position at which the movable guide part is arranged at a position lower than the protruding position in a state where the boom is arranged in the lowered attitude and the boom-side guide part is arranged in the raised attitude.

In the upper spreader guide device, when the attachment work of attaching the upper spreader to the attachment position at the boom is performed, the left and right movable guide parts are arranged at the protruding position in a state where the boom is arranged in the lowered attitude and the boom-side guide part is arranged in the raised attitude, so that a length of the entire guide part including the boom-side guide part and the movable guide part can be sufficiently secured. After the attachment work is completed, protrusion lengths of the left and right movable guide parts from the boom can be reduced only by moving the left and right movable guide parts from the protruding position to the retraction position without moving the entire guide part. Accordingly, the present upper spreader guide device enables a small number of people to perform work for reducing a protrusion length of the movable guide part from the boom while securing the length of the entire guide part.

In the above-described upper spreader guide device, each of the pair of movable guide parts is preferably rotatably supported such that the relative position with respect to the boom-side guide part is changeable between the protruding position and the retraction position. In this configuration, for example, the structure can be simplified as compared with a case where the relative position is changed by a telescopic extendable structure for example.

In the upper spreader guide device, it is more preferable that each of the pair of boom-side guide parts has a first restriction part that restricts the movable guide part rotating toward the protruding position from exceeding the protruding position, and a second restriction part that restricts the movable guide part rotating toward the retraction position from exceeding the retraction position, and each of the pair of movable guide parts has a first restricted part that comes into contact with the first restriction part so that the movable guide part is positioned at the protruding position, and a second restricted part that comes into contact with the second restriction part so that the movable guide part is positioned at the retraction position. In this configuration, when the worker performs the work of rotating the movable guide part toward the protruding position, the first restricted part of the movable guide part comes into contact with the first restriction part of the boom-side guide part, thereby enabling the movable guide part to be accurately arranged at the protruding position. In addition, when the worker performs the work of rotating the movable guide part toward the retraction position, the second restricted part of the movable guide part comes into contact with the second restriction part of the boom-side guide part, thereby enabling the movable guide part to be accurately arranged at the retraction position.

In the upper spreader guide device, it is preferable that each of the pair of boom-side guide parts is rotatably supported by the boom such that a relative position with respect to the boom is changeable between a rising position and a non-rising position, the rising position of each of the pair of boom-side guide parts is a position when the boom-side guide part is arranged in the raised attitude in a state where the boom is arranged in the lowered attitude, and the non-rising position of each of the pair of boom-side guide parts is a position at which the boom-side guide part is arranged at a position lower than the rising position in a state where the boom is arranged in the lowered attitude. In this configuration, a protrusion length of the entire guide part including the boom-side guide part and the movable guide part from the boom can be reduced by rotating each of the pair of boom-side guide parts to change the relative position of the boom-side guide part with respect to the boom from the rising position to the non-rising position.

The invention claimed is:

1. A crane comprising:

a base body;

a boom supported by the base body so as to be raised and lowered;

a gantry supported by the base body;

a connection unit that connects the gantry and a distal end portion of the boom, the connection unit including a lower spreader and an upper spreader, the upper spreader including a left guided part and a right guided part; and an upper spreader guide device for guiding, to an attachment position at the boom, the upper spreader that is lowered by an increase in a distance between the lower spreader and the upper spreader in a state where the boom is arranged in a lowered attitude in which the boom is laid down, wherein the upper spreader guide device includes:

a pair of left and right boom-side guide parts each supported by the boom so as to be arranged in a raised attitude of rising diagonally upward from the boom in a state where the boom is arranged in the lowered attitude; and a pair of left and right movable guide parts respectively supported by the pair of boom-side guide parts such that a relative position with respect to the pair of boom-side guide parts is changeable between a protruding position and a retraction position, wherein the protruding position of each of the pair of movable guide parts is a position at which the movable guide part is arranged in a raised attitude of rising diagonally upward from the boom-side guide part along a rising direction in which the boom-side guide part rises in a state where the boom is arranged in the lowered attitude and the boom-side guide part is arranged in the raised attitude, and the retraction position of each of the pair of movable guide parts is a position at which the movable guide part is arranged at a position lower than the protruding position in a state where the boom is arranged in the lowered attitude and the boom-side guide part is arranged in the raised attitude, wherein the left and right boom-side guide parts each have a boom-side guide surface, the left and right movable guide parts each have a movable part guide surface, the movable part guide surfaces of the left and right movable guide parts are surfaces configured to guide the left and right guided parts of the upper spreader diagonally downward to the boom-side guide surfaces of the left and right boom-side guide parts, respectively, in an attachment work state in which the boom is arranged in the lowered attitude, each of the left and right boom-side guide parts is arranged in the raised attitude and each of the left and right movable guide parts is arranged at the protruding position, and the boom-side guide surfaces of the left and right boom-side guide parts are surfaces configured to guide the left and right guided parts of the upper spreader diagonally downward to move the upper spreader to the attachment position, respectively, in the attachment work state.

2. The crane according to claim 1, wherein each of the pair of movable guide parts is rotatably supported such that the relative position with respect to the boom-side guide part is changeable between the protruding position and the retraction position.

3. The crane according to claim 2, wherein each of the pair of boom-side guide parts has a first restriction part that restricts the movable guide part rotating toward the protruding position from exceeding the protruding position, and a second restriction part that restricts the movable guide part rotating toward the retraction position from exceeding the retraction position, and each of the pair of movable guide parts has a first restricted part that comes into contact with the first restriction part so that the movable guide part is positioned at the protruding position, and a second restricted part that comes into contact with the second restriction part so that the movable guide part is positioned at the retraction position.

4. The crane according to claim 1, wherein each of the pair of boom-side guide parts is rotatably supported by the boom such that a relative position with respect to the boom is changeable between a rising position and a non-rising position, the rising position of each of the pair of boom-side guide parts is a position when the boom-side guide part is arranged in the raised attitude in a state where the boom is arranged in the lowered attitude, and the non-rising position of each of the pair of boom-side guide parts is a position at which the boom-side guide part is arranged at a position lower than the rising position in a state where the boom is arranged in the lowered attitude.

* * * * *